United States Patent [19]
Oka

[11] Patent Number: 5,860,880
[45] Date of Patent: Jan. 19, 1999

[54] LOW NORMAL BICYCLE DERAILLEUR WHICH ALLOWS LATERAL MOVEMENT OF THE CHAIN GUIDE TOWARD THE REAR WHEEL IN RESPONSE TO A FORCE DIRECTED LATERALLY TOWARDS THE REAR WHEEL

[75] Inventor: Mitsuo Oka, Sakai, Japan

[73] Assignee: Shimano, Inc., Osaka, Japan

[21] Appl. No.: 754,321

[22] Filed: Nov. 21, 1996

[51] Int. Cl.⁶ .............................. F16H 9/00; F16H 59/00
[52] U.S. Cl. ................................................ 474/77; 474/82
[58] Field of Search .................... 474/27, 28, 58, 474/72, 80, 82

[56] References Cited

U.S. PATENT DOCUMENTS

| | | | |
|---|---|---|---|
| 2,187,368 | 1/1940 | Todrys | 74/21.7 |
| 3,364,762 | 1/1968 | Maeda | 74/217 |
| 3,535,950 | 10/1970 | Shimano et al. | 74/473 |
| 4,259,873 | 4/1981 | Nagano et al. | 474/82 |
| 4,619,633 | 10/1986 | Nagano | 474/80 |
| 5,302,155 | 4/1994 | Ishibashi | 474/82 |
| 5,407,396 | 4/1995 | Gilbert | 474/80 |
| 5,498,211 | 3/1996 | Hsu | 474/80 |
| 5,518,456 | 5/1996 | Kojima et al. | 474/77 |
| 5,597,366 | 1/1997 | Ozaki | 474/82 |
| 5,624,335 | 4/1997 | Ando | 474/80 |
| 5,649,877 | 7/1997 | Patterson | 474/80 |
| 5,660,407 | 8/1997 | Adams | 474/80 |
| 5,669,840 | 9/1997 | Liao | 474/80 |
| 5,695,421 | 12/1997 | Fukuda | 474/82 |

FOREIGN PATENT DOCUMENTS

| | | | |
|---|---|---|---|
| 47-48452 | 12/1972 | Japan . | |
| 8-40342 | 2/1996 | Japan | B62M 9/10 |

*Primary Examiner*—Charles A. Marmor
*Assistant Examiner*—Matthew A. Kaness
*Attorney, Agent, or Firm*—James A. Deland

[57] ABSTRACT

A rear derailleur for a bicycle includes a base member for attaching the derailleur to the bicycle, a movable member for supporting a chain guide, a linkage mechanism coupling the base member to the movable member so that the movable member is capable of movement relative to the base member, a biasing mechanism for biasing the movable member toward a wheel of the bicycle, and an actuating member for coupling to a control cable of the type having an inner wire that slides within an outer casing so that pulling the inner wire causes the movable member to move away from the rear wheel of the bicycle against the biasing of the biasing mechanism and releasing the control cable causes the movable member to move toward the rear wheel of the bicycle in accordance with the biasing of the biasing mechanism. A shock absorber is coupled in a path between the control cable and the movable member for allowing the movable member to move relative to the base member when an external force having a component directed toward the rear wheel is applied to the derailleur.

35 Claims, 7 Drawing Sheets

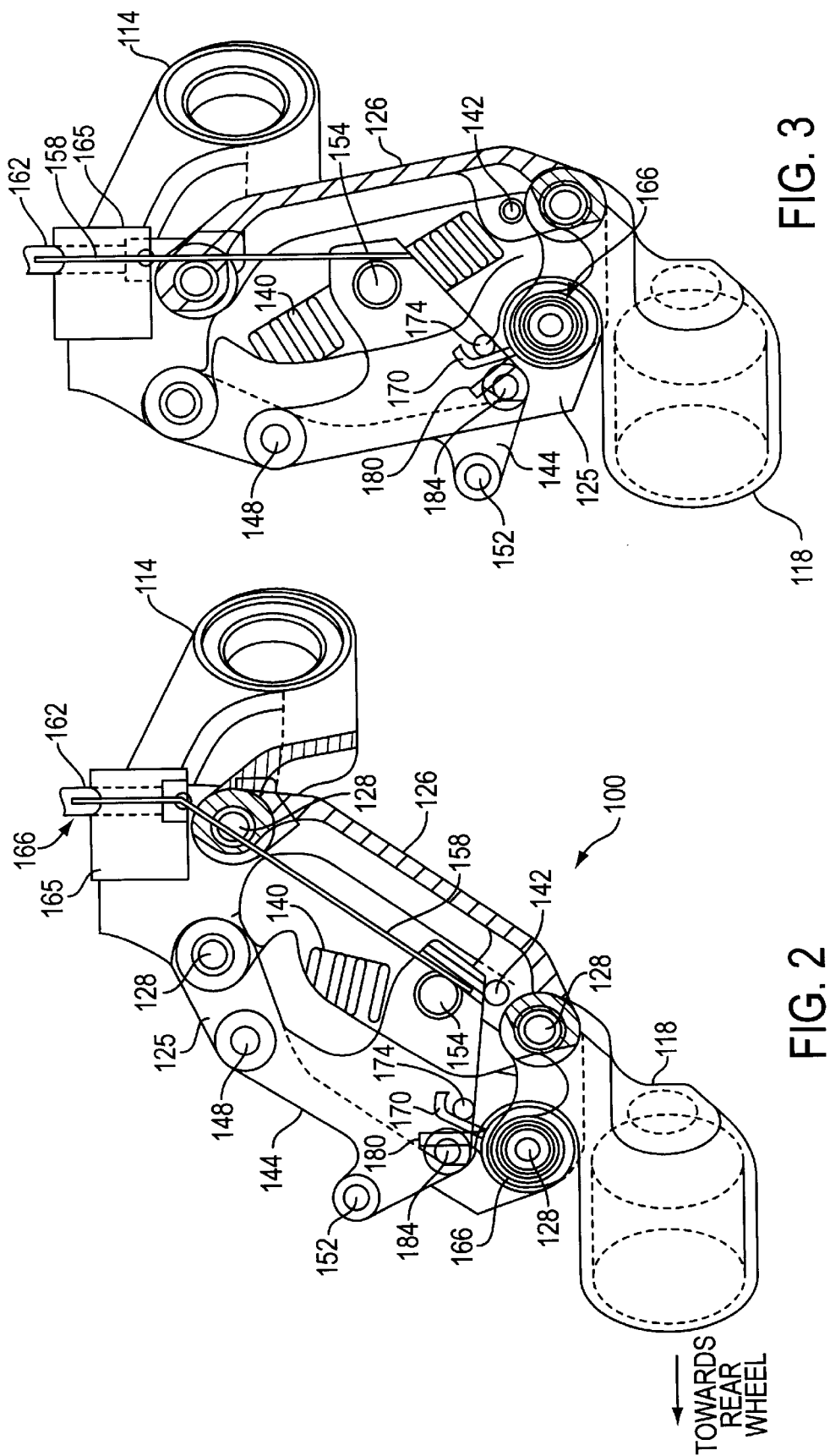

LOW NORMAL BICYCLE DERAILLEUR WHICH ALLOWS LATERAL MOVEMENT OF THE CHAIN GUIDE TOWARD THE REAR WHEEL IN RESPONSE TO A FORCE DIRECTED LATERALLY TOWARDS THE REAR WHEEL

BACKGROUND OF THE INVENTION

The present invention is directed to bicycle components and, more particularly, to a bicycle rear derailleur with a shock absorber that accommodates external forces applied to the derailleur.

FIG. 1 shows a typical bicycle rear derailleur 10 which, for example, may be constructed in accordance with the teachings of U.S. Pat. No. 4,610,644, incorporated herein by reference. Derailleur 10 includes a base member 14 for attaching derailleur 10 to a bicycle frame 16 through an optional fixing member 17, a movable member 18 attached to a chain guide 22 which includes a guide pulley 23 and a tension pulley 24, and links 25, 26 coupled to base member 14 and movable member 18 through connecting pins 28 to form a conventional pantograph mechanism. It is well known in the art that this structure allows chain guide 22 to move from the position shown in solid lines to the position shown in broken lines in response to movement of a control cable (not shown) so as to position chain guide 22 beneath a selected one of a plurality of sprockets S attached to a rear wheel of the bicycle. A threaded shaft 30 is used to fix base member 14 to fixing member 17 (or directly to the bicycle), and a spring (not shown) is disposed within base member 14 to bias base member 14 clockwise (when viewed from the right side) relative to the bicycle. A similar spring (not shown) is disposed within movable member 18 for biasing chain guide 22 clockwise relative to movable member 18 (when viewed from the right side).

A return spring (not shown) is normally provided for biasing chain guide 22 toward a home position, which can be either the position shown in solid lines or the position shown in broken lines. If the return spring biases chain guide 22 toward the position shown in solid lines (so that chain guide 22 is disposed beneath the smallest sprocket $S_1$), then the derailleur is called a "high normal" derailleur. Pulling the control cable causes such a derailleur to move the chain guide 22 from the position shown in solid lines toward the position shown in broken lines (toward the rear wheel). If the return spring biases chain guide 22 toward the position shown in broken lines (so that chain guide 22 is disposed beneath the largest sprocket $S_2$), then the derailleur is called a "low normal" derailleur. Pulling the control cable causes such a derailleur to move the chain guide from the position shown in broken lines toward the position shown in solid lines (away from the rear wheel).

The two types of derailleurs (low normal and high normal) differ in how they react to external forces applied to the derailleur, such as when the bicycle falls over or is struck from the side. When an external force toward the rear wheel is applied to a high normal derailleur, the force acts in a direction to compress the control cable. Since the control cable does not resist such compression to any significant extent, the movable member readily moves toward the rear wheel to accommodate the external force. However, when an external force toward the rear wheel is applied to a low normal derailleur, the force acts in the direction to further tension the control cable. In this case the control cable strongly resists movement of the movable member toward the rear wheel, and damage to the cable or derailleur is likely to occur.

SUMMARY OF THE INVENTION

The present invention is directed to a low normal type derailleur which includes a shock absorber to accommodate external forces toward applied to the derailleur. In one embodiment of the present invention, a rear derailleur for a bicycle includes a base member for attaching the derailleur to the bicycle, a movable member for supporting a chain guide, a linkage mechanism coupling the base member to the movable member so that the movable member is capable of movement relative to the base member, a biasing mechanism for biasing the movable member toward a wheel of the bicycle, and an actuating member for coupling to a control cable of the type having an inner wire which slides within an outer casing. Pulling the inner wire causes the movable member to move away from the rear wheel of the bicycle against the biasing of the biasing mechanism, and releasing the inner wire causes the movable member to move toward the rear wheel of the bicycle in accordance with the biasing of the biasing mechanism. A shock absorber is coupled in a path between the control cable and the movable member for allowing the movable member to move relative to the base member when an external force having a component directed toward the rear wheel is applied to the derailleur. More specifically, the shock absorber is structured to allow the movable member to move toward the rear wheel of the bicycle to accommodate the external force.

In a more specific embodiment, the linkage mechanism comprises first and second links, each having a first end coupled to the base member and a second end coupled to the movable member. The actuating member comprises an actuating arm pivotally coupled to the first link, and the shock absorber comprises a spring having a first end coupled to the first link and a second end coupled to the actuating arm. The spring has sufficient tension to cause the actuating arm to move together with the first link when the control cable is pulled and no external force is applied to the derailleur. On the other hand, the spring allows the actuating arm and the first link to pivot relative to each other when an external force toward the rear wheel is applied to the derailleur. This, in turn, allows the movable member to move toward the rear wheel to accommodate the external force.

In another embodiment of the present invention, the first actuating arm is pivotally coupled to the base member, and the actuating arm is structured for connecting to the outer casing of the control cable. The shock absorber comprises a spring having a first end coupled to the base member and a second end coupled to the first actuating arm. The spring has sufficient tension to fix the first actuating arm relative to the base member when the control cable is pulled and no external force toward the rear wheel is applied to the derailleur. On the other hand, the spring allows the actuating arm and the base member to pivot relative to each other when an external force toward the rear wheel is applied to the derailleur. This, in turn, allows the movable member to move toward the rear wheel to accommodate the external force.

In another embodiment of the present invention, the actuating arm again is pivotally coupled to the first link, and the shock absorber comprises a spring having a first end coupled to the first link and a second end coupled to the actuating arm. However, in this embodiment the spring also functions as the biasing mechanism. This is accomplished by disposing the actuating arm in a cavity defined by the first link so that the biasing action of the spring acts against the first link for biasing the movable member toward the rear wheel. As with the other embodiments the spring has sufficient tension to cause the actuating arm to move together with the first link when the control cable is pulled and no external force toward the rear wheel is applied to the derailleur. On the other hand, the spring allows the actuating arm and the first link to pivot relative to each other when an external force toward the rear wheel is applied to the derailleur. This, in turn, allows the movable member to move toward the rear wheel to accommodate the external force.

In another embodiment of the present invention, the first actuating arm is pivotally coupled to the movable member, and the actuating arm is structured for connecting to the inner wire of the control cable. The shock absorber comprises a spring having a first end coupled to the movable member and a second end coupled to the first actuating arm. The spring has sufficient tension to fix the first actuating arm relative to the movable member when the control cable is pulled and no external force toward the rear wheel is applied to the derailleur. On the other hand, the spring allows the actuating arm and the movable member to pivot relative to each other when an external force toward the rear wheel is applied to the derailleur. This, in turn, allows the movable member to move toward the rear wheel to accommodate the external force.

BRIEF DESCRIPTION OF THE DRAWINGS

FIG. 2 is an oblique view of a low normal derailleur which incorporates a particular embodiment of a shock absorber according to the present invention, wherein the derailleur is located in its home position;

FIG. 3 is an oblique view of the derailleur shown in FIG. 2 after pulling the control cable;

DETAILED DESCRIPTION OF THE EMBODIMENTS

Figure 1:
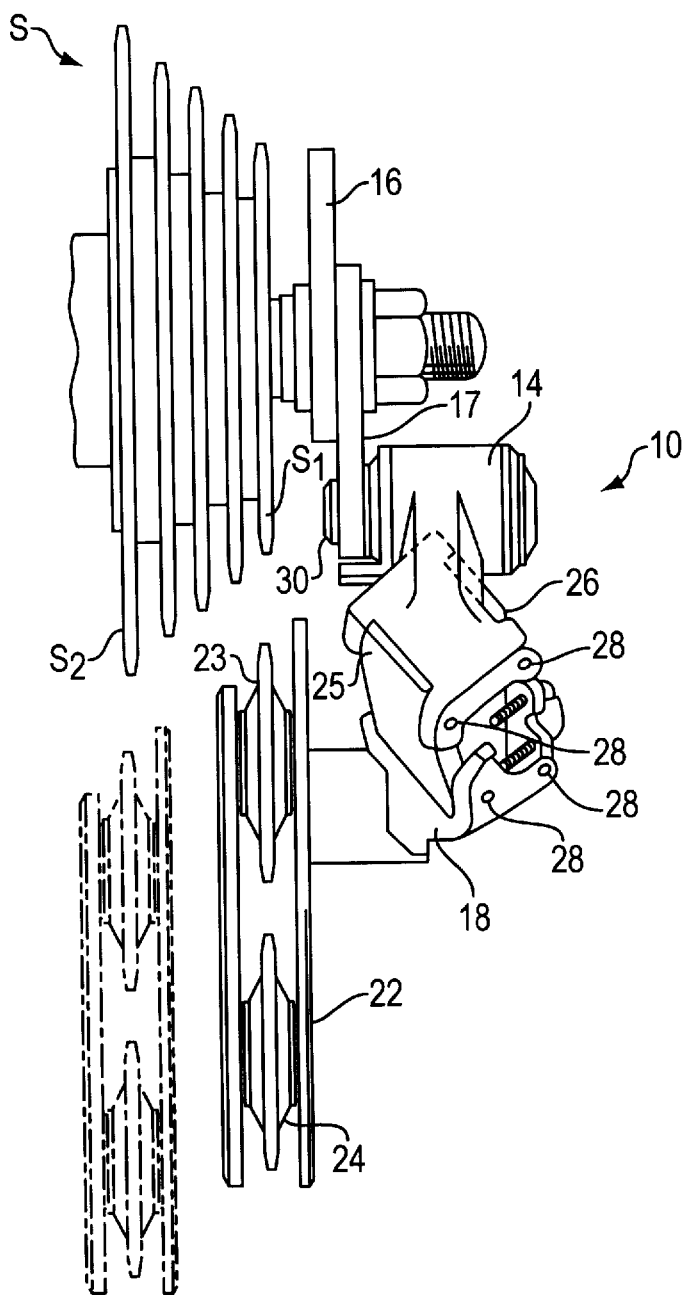
FIG. 1 is a rear view of a known derailleur.

FIG. 2 is an oblique view of a particular embodiment of a low normal derailleur 100 according to the present invention in its home position. In this embodiment, the basic structure of derailleur 100 may be the same as the derailleur described above and disclosed in U.S. Pat. No. 4,610,644. That is, derailleur 100 may include a base member 114, a movable member 118 and links 125 and 126. The ends of links 125 and 126 are coupled to base member 114 and movable member 118 through pins 128 to form a pantograph mechanism. Movable member 118 is coupled to a chain guide (not shown), and both base member 114 and movable member 118 may include springs for pivotably biasing these components in the same manner as disclosed in U.S. Pat. No. 4,610,644. One end of a return spring 140 is connected to the upper left pivot pin 128, and the other end of return spring 140 is connected a pin 142 proximate the lower right pivot pin 128 for biasing movable member 118 toward the rear wheel (i.e., towards the largest sprocket in the multiple sprocket assembly mounted to the rear wheel).

An actuating arm 144 is pivotably mounted to link 125 through a pivot pin 148. Actuating arm 144 includes a link stopper 152 in the form of a pin which extends toward link 125 for limiting the range of motion of actuating arm 144 relative to link 125. Actuating arm 144 also includes a cable connector 154 for fixing an inner wire 158 of a control cable 160 thereto. Control cable 160 is a conventional control cable of the type wherein inner wire 158 slides within a cable housing 162. An end of cable housing 162 is fitted within a housing receptacle 165 affixed to or formed integrally with base member 114.

Figure 4:
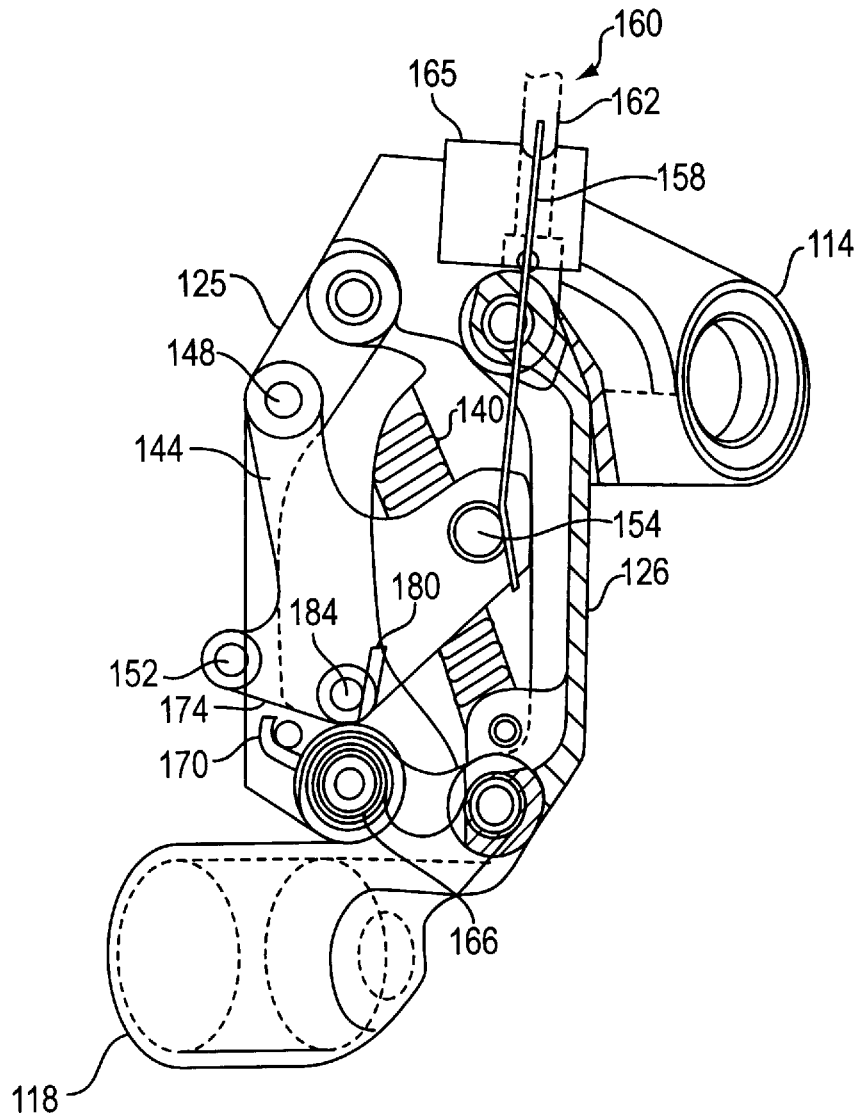
FIG. 4 is an oblique view of the derailleur shown in FIG. 2 illustrating the operation of the shock absorber.
Figure 5:
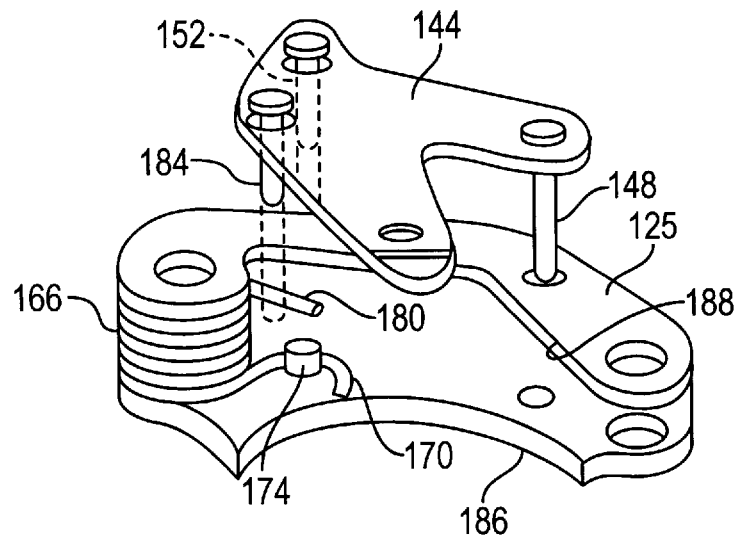
FIG. 5 is an exploded view illustrating the construction of the shock absorber shown in FIGS. 2–4.
Figure 6:
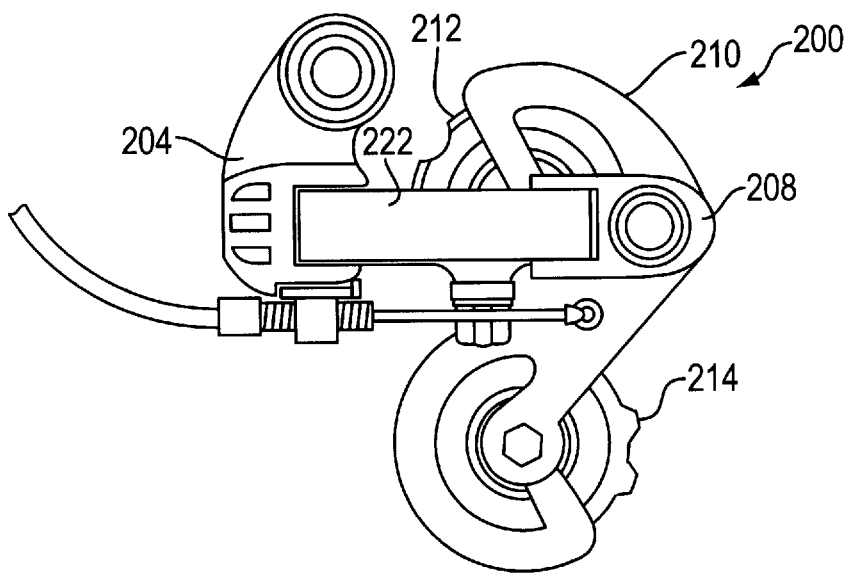
FIG. 6 is a side view of a low normal derailleur which incorporates another embodiment of a shock absorber according to the present invention.
Figure 7:
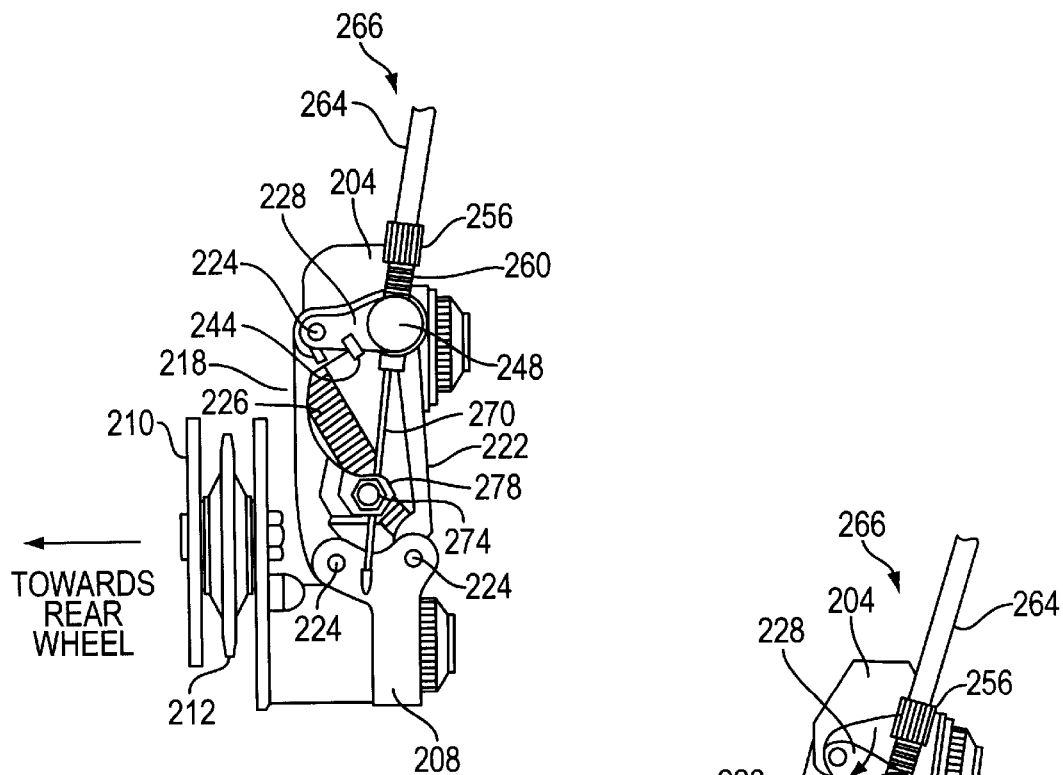
FIG. 7 is a bottom view of the derailleur shown in FIG. 6.

A coil spring 166 is mounted around the lower left pin 128. Spring 166 has one end 170 which contacts a stopper 174 in the form of a pin connected to or integrally formed with link 125. Another end 180 of spring 166 contacts a stopper 184 in the form of a pin connected to or integrally formed with actuating arm 144. In this embodiment, spring ends 170 and 180 are disposed between side walls 186 and 188 of link 125 (see FIG. 5), but other orientations are possible. Spring 166 has a tension such that, when no external forces are applied to derailleur 100, actuating arm 144 moves as a unit with link 125 when inner wire 158 is pulled as shown in FIG. 3. On the other hand, when an external force having a component directed toward the rear wheel (to the left in FIGS. 2 and 3) is applied to links 125 and 126, movable member 118 or any other part of the derailleur connected to base member 114, spring 166 allows actuating arm 144 and link 125 to move relative to each other as shown in FIG. 4. More specifically, while actuating arm 144 is held in a fixed position by control cable 160, link 125 is allowed to move clockwise relative to actuating arm 144 so that the distance between cable connector 154 and housing receptacle 165 remains substantially constant, and movable member 118 moves toward the rear wheel (to the left as shown in FIGS. 3 and 4) until stopper 152 contacts the side of link 125 to accommodate the external force. As a result, damage to the derailleur is avoided.

FIGS. 6–9 are views of a low normal derailleur 200 which incorporates another embodiment of a shock absorber according to the present invention. Derailleur 200 includes a base member 204, a movable member 208 which supports a chain guide 210 having a guide pulley 212 and a tension pulley 214, and links 218 and 222 connected to base member 204 and movable member 208 through pins 224 to form a pantograph mechanism. As in the previous embodiment, springs (not shown) may be disposed within base member 204 and/or movable member 208 to bias the components in the manner disclosed in U.S. Pat. No. 4,610,644. A return spring 226 is connected between the upper left and lower right pins 224 (as viewed in FIGS. 7 and 8) to bias the chain guide 210 toward the rear wheel (i.e., towards the largest sprocket in the multiple sprocket assembly mounted to the rear wheel).

In this embodiment, an actuating arm 228 is pivotally coupled to base member 204 through the upper left pivot pin 224. Actuating arm 228 is disposed in a recess 232 (FIG. 9) formed in base member 204, and an abutment 236 formed by recess 232 limits the range of pivoting of actuating arm 228 relative to base member 204 in the counterclockwise direction. A spring 240 has a first end 242 which contacts the lower portion of abutment 236 and a second end 244 which contacts the side of actuating arm 228. Spring 240 biases actuating arm 228 counterclockwise. The tension of spring 240 is sufficient to maintain actuating arm 228 pressed against abutment 236 during normal operation of the derailleur, ie., when no external forces are applied to the derailleur.

A cable support 248 having a threaded opening 252 is attached to the end of actuating arm 228 opposite pin 224, and an outer casing receptacle 256 having a threaded portion 260 is screwed into the threaded opening 252. An outer casing 264 of a control cable 266 is fitted within outer casing receptacle 256 such that an inner cable 270 of control cable 266 exits the threaded portion 260. Inner cable 270 is fixed to a cable fixing member 274 (e.g., a screw) attached to another actuating arm 278 rigidly fixed to link 218.

Figure 8:
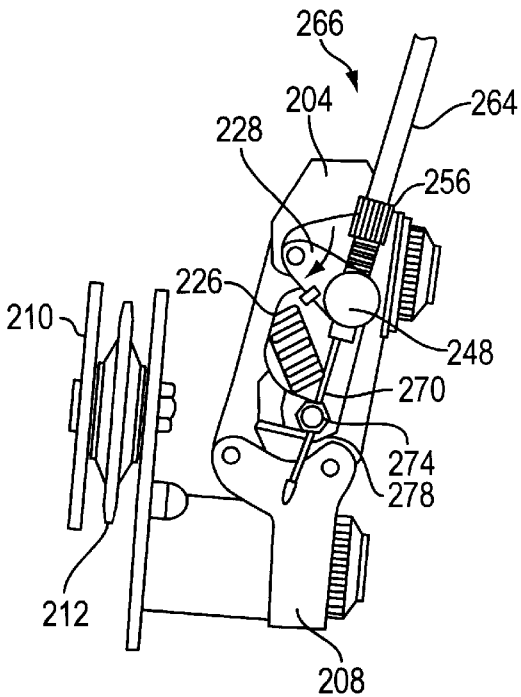
FIG. 8 is a bottom view of the derailleur shown in FIG. 6 illustrating the operation of the shock absorber.
Figure 9:
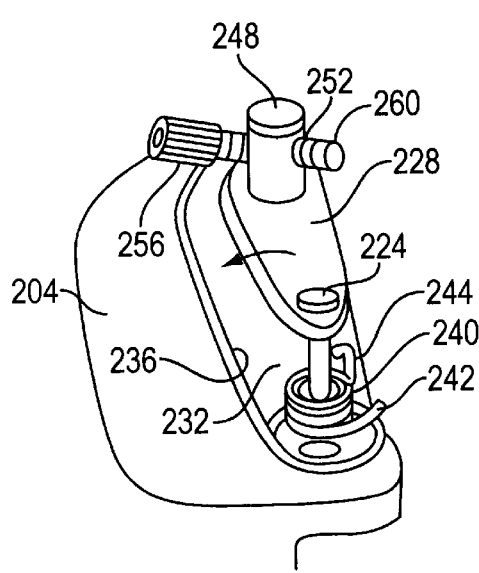
FIG. 9 is an exploded view illustrating the construction of the shock absorber shown in FIGS. 6–8.

When inner cable 270 is pulled, actuating arm 228 normally remains, fixed against abutment 236 as a result of the tension exerted by spring 240. Inner cable 270 thus pulls actuating arm 278 which, in turn, causes movable member 208 to move away from the rear wheel of the bicycle against the biasing force of return spring 226. Conversely, when inner cable 270 is released, movable member 208 moves toward the rear wheel in accordance with the biasing force of return spring 226. When an external force having a component directed toward the rear wheel is applied to movable member 208, chain guide 210, links 218,222 or some other part of the derailleur connected to base member 204, the external force causes actuating arm 228 to pivot clockwise relative to base member 204 (the distance between cable fixing member 274 and cable support 248 remains substantially constant as shown in FIG. 8), thus accommodating the external force and avoiding damage to the derailleur.

Figure 10:
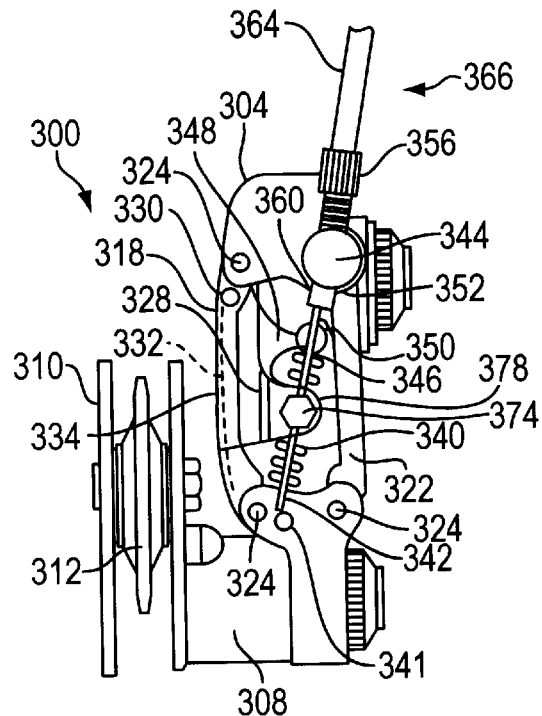
FIG. 10 is a bottom view of a low normal derailleur which incorporates another embodiment of a shock absorber according to the present invention.
Figure 11:
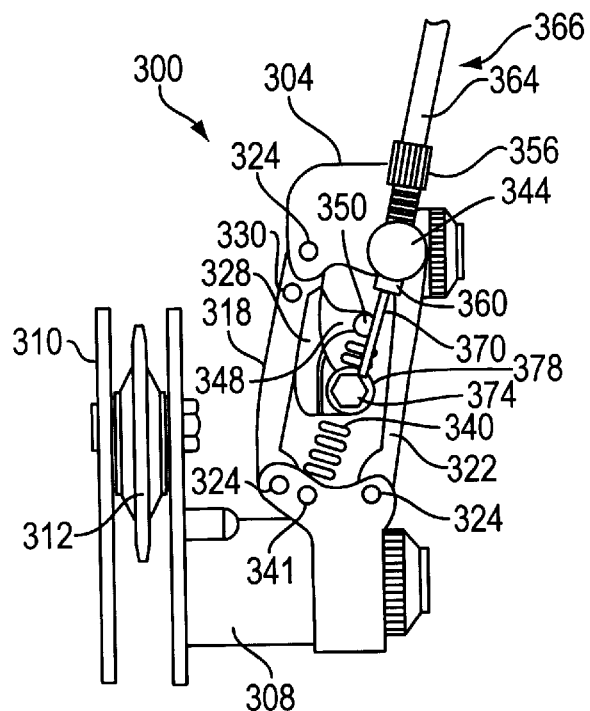
FIG. 11 is a bottom view of the derailleur shown in FIG. 10 showing the operation of the shock absorber.

FIGS. 10–11 are views of a low normal derailleur 300 which incorporates another embodiment of a shock absorber according to the present invention. Derailleur 300 includes a base member 304, a movable member 308 which supports a chain guide 310 having a guide pulley 312 and a tension pulley (not shown), and links 318 and 322 connected to base member 304 and movable member 308 through pins 324 to form a pantograph mechanism. As in the previous embodiment, springs (not shown) may be disposed within base member 304 and/or movable member 308 to bias the components in the manner disclosed in U.S. Pat. No. 4,610,644.

In this embodiment, an actuating arm 328 is pivotally coupled to link 318 through a pivot pin 330. Actuating arm 328 is disposed in a cavity or recess 332 defined by link 318 so that a bottom surface 334 of link 318 limits the range of pivoting of actuating arm 328 relative to link 318 in the clockwise direction. A cable support 344 having a threaded opening 352 is attached to base member 304, and an outer casing receptacle 356 having a threaded portion 360 is screwed into the threaded opening 352. Cable support 344 may be formed integrally with the upper right pin 324. An outer casing 364 of a control cable 366 is fitted within outer casing receptacle 356 such that an inner cable 370 of control cable 366 exits the threaded portion 360. Inner cable 370 is fixed to a cable fixing member 374 (e.g., a screw) attached to a projection 378 formed at the free end of actuating arm 328.

A return spring 340 has a first end 342 connected to movable member 308 through a pin 341. A second end 346 of return spring 340 is connected to an extension 348 of actuating arm 328 proximate pivot pin 330 through a pin 350. Return spring 340 biases actuating arm 328 clockwise so that actuating arm 328 is biased toward the bottom surface 334 of link 318. The tension of return spring 340 is sufficient to maintain actuating arm 328 pressed against bottom surface 334 during normal operation of the derailleur, i.e., when no external forces are applied to the derailleur.

It should be apparent that return spring 340 biases the chain guide 310 toward the rear wheel (i.e., towards the largest sprocket in the multiple sprocket assembly mounted to the rear wheel), and it also functions as the shock absorber to accommodate external forces applied to the rear derailleur. Thus, when inner cable 370 is pulled, actuating arm 328 remains fixed against the bottom surface 334 of link 318 as a result of the tension exerted by spring 340. Inner cable 370 pulls on extension 378 of actuating arm 328 which, in turn, causes movable member 308 to move away from the rear wheel of the bicycle against the biasing force of return spring 340. Conversely, when inner cable 370 is released, movable member 308 moves toward the rear wheel in accordance with the biasing force of return spring 340. When an external force having a component directed toward the rear wheel is applied to movable member 308, chain guide 310, links 318,322 or some other part of the derailleur connected to base member 304, the external force causes actuating arm 328 to pivot counterclockwise relative to link 318 (the distance between cable fixing member 374 and cable support 344 remains substantially constant as shown in FIG. 11), thus accommodating the external force and avoiding damage to the derailleur.

Figure 12:
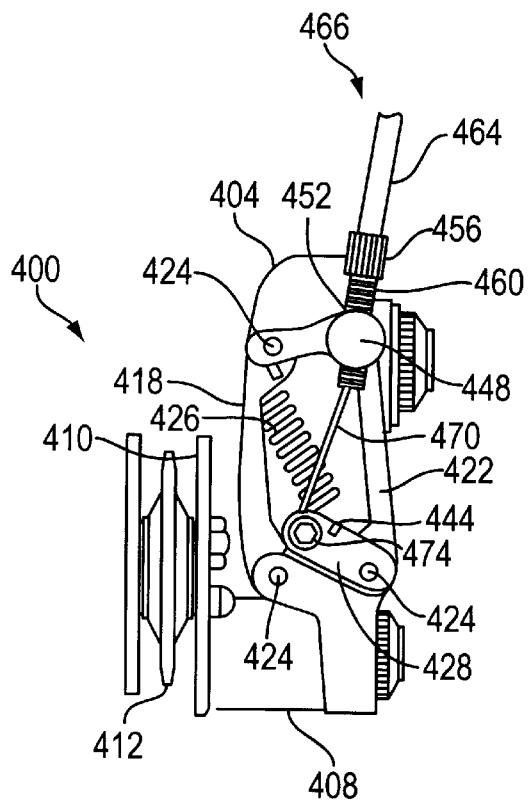
FIG. 12 is a bottom view of a low normal derailleur which incorporates another embodiment of a shock absorber according to the present invention.
Figure 13:
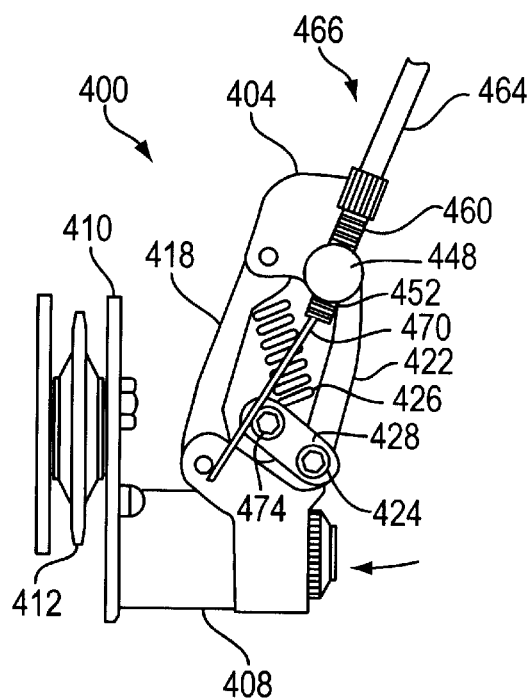
FIG. 13 is a bottom view of the derailleur shown in FIG. 12 showing the operation of the shock absorber.
Figure 14:
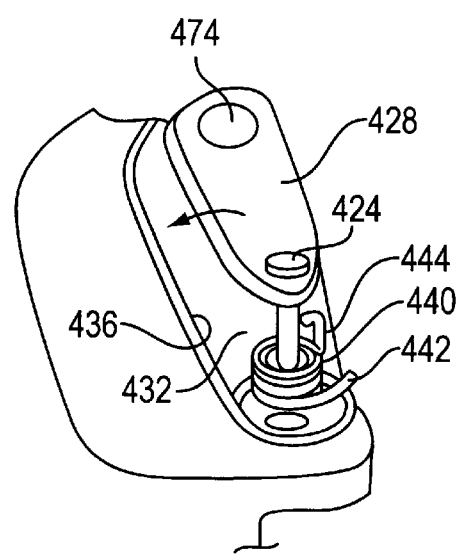
FIG. 14 is an exploded view illustrating the construction of the shock absorber shown in FIGS. 12 and 13.

FIGS. 12, 13 and 14 are views of a low normal derailleur 400 which incorporates another embodiment of a shock absorber according to the present invention. This embodiment operates in a manner similar to the embodiment shown in FIGS. 6–9, but in this embodiment the pivoting actuating arm is mounted to the movable member. More specifically, derailleur 400 includes a base member 404, a movable member 408 which supports a chain guide 410 having a guide pulley 412 and a tension pulley (not shown), and links 418 and 422 connected to base member 404 and movable member 408 through pins 424 to form a pantograph mechanism. As in the previous embodiments, springs (not shown) may be disposed within base member 404 and/or movable member 408 to bias the components in the manner disclosed in U.S. Pat. No. 4,610,644. A return spring 426 is connected between the upper left and lower right pins 424 to bias the chain guide 410 toward the rear wheel (i.e., towards the largest sprocket in the multiple sprocket assembly mounted to the rear wheel).

A cable support 448 having a threaded opening 452 is attached to the base member 404 at approximately the location of the upper right pin 424, and an outer casing receptacle 456 having a threaded portion 460 is screwed into the threaded opening 452. An outer casing 464 of a control cable 466 is fitted within outer casing receptacle 456 such that an inner cable 470 of control cable 466 exits the threaded portion 460.

Inner cable 470 is fixed to a cable fixing member 474 (e.g., a screw) attached to an actuating arm 428 pivotably fixed to movable member 408 through the lower right pivot pin 424. Actuating arm 428 is disposed in a recess 432 (FIG. 14) formed in movable member 408, and an abutment 436 formed by recess 432 limits the range of pivoting of actuating arm 428 relative to movable member 408 in the counterclockwise direction. A spring 440 has a first end 442 which contacts the lower portion of abutment 436 and a second end 444 which contacts the side of actuating arm 428. Spring 440 biases actuating arm 428 counterclockwise. The tension of spring 440 is sufficient to maintain actuating arm 428 pressed against abutment 436 during normal operation of the derailleur, ie., when no external forces are applied to the derailleur.

When inner cable 470 is pulled, actuating arm 428 normally remains fixed against abutment 436 as a result of the tension exerted by spring 440. Inner cable 470 thus pulls actuating arm 428 which, in turn, causes movable member 408 to move away from the rear wheel of the bicycle against the biasing force of return spring 426. Conversely, when inner cable 470 is released, movable member 408 moves toward the rear wheel in accordance with the biasing force of return spring 426. When an external force having a component directed toward the rear wheel is applied to movable member 408, chain guide 410, links 418,422 or some other part of the derailleur connected to base member 404, the external force causes actuating arm 428 to pivot clockwise relative to movable member 408 (the distance between cable fixing member 474 and cable support 448 remains substantially constant as shown in FIG. 13), thus accommodating the external force and avoiding damage to the derailleur.

While the above is a description of various embodiments of the present invention, further modifications may be employed without departing from the spirit and scope of the present invention. For example, the size, shape, orientation and arrangement of the parts may be varied to suit the particular application. Stopper 152 may be omitted, if desired. The spring ends may be coupled to the components through attachment, through abutment, or through intermediary components. From the various embodiments it should be apparent that the shock absorber can be placed anywhere in a path between the control cable and the movable member. Thus, the scope of the invention should not be limited by the specific structures disclosed. Instead, the true scope of the invention should be determined by the following claims.

What is claimed is:

1. A rear derailleur for a bicycle comprising:

a base member for attaching the derailleur to the bicycle;

a movable member for supporting a chain guide;

a linkage mechanism coupling the base member to the movable member so that the movable member is capable of movement relative to the base member;

a biasing mechanism for biasing the movable member laterally toward a wheel of the bicycle;

an actuating member, wherein pulling the actuating member causes the movable member to move laterally away from the rear wheel of the bicycle against a biasing force of the biasing mechanism and releasing the actuating member causes the movable member to move laterally toward the rear wheel of the bicycle in the direction of the biasing force of the biasing mechanism; and a shock absorber coupled in a path between the actuating member and the movable member for allowing the movable member to move relative to the base member laterally toward the rear wheel when an external force having a component directed laterally toward the rear wheel is applied to the derailleur and the actuating member is in a fixed position.

2. The rear derailleur according to claim 1 wherein the shock absorber comprises a spring having a first end operatively coupled to the actuating member and a second end operatively coupled to the movable member.

3. The rear derailleur according to claim 1 wherein the linkage mechanism comprises:

a first link having a first end coupled to the base member and a second end coupled to the movable member; and a second link having a first end coupled to the base member and a second end coupled to the movable member.

4. The rear derailleur according to claim 3 wherein the actuating member comprises a first actuating arm.

5. The rear derailleur according to claim 4 wherein the first actuating arm is pivotally coupled to the base member.

6. The rear derailleur according to claim 5 wherein the shock absorber comprises a spring having a first spring end coupled to the base member and a second spring end coupled to the first actuating arm.

7. The rear derailleur according to claim 6 wherein the base member includes an arm stopper for limiting pivoting of the first actuating arm relative to the base member.

8. The rear derailleur according to claim 6 wherein the base member includes a first spring end contacting member for contacting the first spring end.

9. The rear derailleur according to claim 8 wherein the first actuating arm includes a second spring end contacting member for contacting the second spring end.

10. The rear derailleur according to claim 9 wherein the spring has sufficient tension to fix the first actuating arm relative to the base member when the actuating arm is pulled and no external force having a component directed laterally toward the rear wheel is applied to the derailleur, and wherein the spring allows the first actuating arm and the base member to pivot relative to each other when an external force having a component directed laterally toward the rear wheel is applied to the derailleur.

11. The rear derailleur according to claim 10 wherein the rear derailleur is structured to connect to a control cable having an inner wire that moves within an outer casing, and wherein the first actuating arm is structured for connecting to the outer casing of the control cable.

12. The rear derailleur according to claim 11 further comprising a second actuating arm rigidly connected to the first link and structured for connecting to the inner wire of the control cable.

13. The rear derailleur according to claim 4 wherein the first actuating arm is pivotally coupled to the first link.

14. The rear derailleur according to claim 13 wherein the shock absorber comprises a spring having a first spring end coupled to the first link and a second spring end coupled to the first actuating arm.

15. The rear derailleur according to claim 14 wherein the first actuating arm includes a link stopper for limiting pivoting of the first actuating arm relative to the first link.

16. The rear derailleur according to claim 14 wherein the first link includes a first spring end contacting member for contacting the first spring end.

17. The rear derailleur according to claim 16 wherein the first actuating arm includes a second spring end contacting member for contacting the second spring end.

18. The rear derailleur according to claim 17 wherein the spring has sufficient tension to cause the first actuating arm to move together with the first link when the actuating arm is pulled and no external force having a component directed laterally toward the rear wheel is applied to the derailleur, and wherein the spring allows the first actuating arm and the first link to pivot relative to each other when an external force having a component directed laterally toward the rear wheel is applied to the derailleur.

19. The rear derailleur according to claim 18 wherein the rear derailleur is structured to connect to a control cable having an inner wire that moves within an outer casing, and wherein the first actuating arm is structured for connecting to the inner wire of the control cable.

20. The rear derailleur according to claim 13 wherein the shock absorber comprises a spring having a first spring end coupled to the movable member and a second spring end coupled to the first actuating arm.

21. The rear derailleur according to claim 20 wherein the first actuating arm is disposed within a cavity defined by the first link so that a surface of the first link limits pivoting of the first actuating arm relative to the first link.

22. The rear derailleur according to claim 20 wherein the first link includes an arm stopper for limiting pivoting of the first actuating arm relative to the first link.

23. The rear derailleur according to claim 20 wherein the movable member includes a first spring end contacting member for contacting the first spring end.

24. The rear derailleur according to claim 23 wherein the first actuating arm includes a second spring end contacting member for contacting the second spring end.

25. The rear derailleur according to claim 24 wherein the spring has sufficient tension to cause the first actuating arm to move together with the first link when the actuating arm is pulled and no external force having a component directed laterally toward the rear wheel is applied to the derailleur, and wherein the spring allows the first actuating arm and the first link to pivot relative to each other when an external force having a component directed laterally toward the rear wheel is applied to the derailleur.

26. The rear derailleur according to claim 25 wherein the rear derailleur is structured to connect to a control cable having an inner wire that moves within an outer casing, and wherein the first actuating arm is structured for connecting to the inner wire of the control cable.

27. The derailleur according to claim 26 wherein the spring forms the biasing mechanism.

28. The rear derailleur according to claim 4 wherein the first actuating arm is pivotally coupled to the movable member.

29. The rear derailleur according to claim 28 wherein the shock absorber comprises a spring having a first spring end coupled to the movable member and a second spring end coupled to the first actuating arm.

30. The rear derailleur according to claim 29 wherein the movable member includes an arm stopper for limiting pivoting of the first actuating arm relative to the movable member.

31. The rear derailleur according to claim 29 wherein the movable member includes a first spring end contacting member for contacting the first spring end.

32. The rear derailleur according to claim 31 wherein the first actuating arm includes a second spring end contacting member for contacting the second spring end.

33. The rear derailleur according to claim 32 wherein the spring has sufficient tension to fix the first actuating arm relative to the movable member when the actuating arm is pulled and no external force having a component directed laterally toward the rear wheel is applied to the derailleur, and wherein the spring allows the first actuating arm and the movable member to pivot relative to each other when an external force having a component directed laterally toward the rear wheel is applied to the derailleur.

34. The rear derailleur according to claim 33 wherein the rear derailleur is structured to connect to a control cable having an inner wire that moves within an outer casing, and wherein the first actuating arm is structured for connecting to the inner wire of the control cable.

35. The rear derailleur according to claim 1 wherein the biasing mechanism biases the movable member in a direction away from the base member.

* * * * *